(12) United States Patent
Sasao et al.

(10) Patent No.: US 8,963,525 B2
(45) Date of Patent: Feb. 24, 2015

(54) DC/DC CONVERTER AND GAME MACHINE USING IT

(71) Applicant: Sony Computer Entertainment Inc., Tokyo (JP)

(72) Inventors: Kazuki Sasao, Tokyo (JP); Kazuaki Mitsui, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 14/048,730

(22) Filed: Oct. 8, 2013

(65) Prior Publication Data

US 2014/0111172 A1  Apr. 24, 2014

(30) Foreign Application Priority Data

Oct. 24, 2012  (JP) ................. 2012-235020

(51) Int. Cl.
*G05F 1/40* (2006.01)
*H02M 3/158* (2006.01)

(52) U.S. Cl.
CPC .......... *H02M 3/1588* (2013.01); *H02M 3/1584* (2013.01); *H02M 2003/1586* (2013.01)
USPC ........................................................ 323/282

(58) Field of Classification Search
USPC .......... 323/225, 265, 268, 282–286, 290, 351
See application file for complete search history.

(56) References Cited

U.S. PATENT DOCUMENTS

| | | | | |
|---|---|---|---|---|
| 5,847,554 A | * | 12/1998 | Wilcox et al. | 323/282 |
| 6,127,815 A | * | 10/2000 | Wilcox | 323/282 |
| 6,215,290 B1 | * | 4/2001 | Yang et al. | 323/282 |
| 6,232,754 B1 | * | 5/2001 | Liebler et al. | 323/272 |
| 6,404,175 B1 | * | 6/2002 | Yang et al. | 323/282 |
| 6,828,766 B2 | * | 12/2004 | Corva et al. | 323/284 |
| 7,265,522 B2 | * | 9/2007 | Sutardja et al. | 323/222 |
| 7,521,913 B2 | * | 4/2009 | Tang et al. | 323/283 |
| 7,936,160 B1 | * | 5/2011 | Sheehan | 323/285 |
| 7,965,070 B2 | * | 6/2011 | Nakahashi | 323/285 |
| 8,258,765 B2 | * | 9/2012 | Nishida | 323/277 |
| 8,570,009 B2 | * | 10/2013 | Wei et al. | 323/272 |
| 2008/0310200 A1 | * | 12/2008 | Maksimovic et al. | 363/65 |

* cited by examiner

*Primary Examiner* — Adolf Berhane
(74) *Attorney, Agent, or Firm* — Matthew B. Dernier, Esq.; Gibson & Dernier LLP

(57) ABSTRACT

The present disclosure is to provide a DC/DC converter capable of suppressing increase in the ripple amount of the output voltage in association with switching of the number of drive phases. N (N is an integer equal to or larger than 2) switching circuits each generate a switching voltage at the switching node according to an input pulse signal. A phase controller dynamically switches the number K (K is an integer equal to or smaller than N) of drive phases according to the state of a DC/DC converter at the time. A pulse modulator generates a pulse signal whose frequency changes according to the number K of drive phases. A distributor selects K switching circuits among the N switching circuits and distributes the pulse signal to each of the selected K switching circuits with a phase difference of (360/K) degrees.

10 Claims, 9 Drawing Sheets

 FIG. 8A K=2
 FIG. 8B K=3
 FIG. 8C K=4

DC/DC CONVERTER AND GAME MACHINE USING IT

BACKGROUND

The present disclosure relates to a direct current/direct current (DC/DC) converter.

In electronic apparatus such as a personal computer and a game dedicated machine, a DC/DC converter (switching regulator) that steps down a DC voltage supplied from a battery or an inverter to the optimum voltage level for a load is utilized.

FIG. 1 is a circuit diagram showing a configuration example of a buck DC/DC converter on which the present inventors have made studies. A DC/DC converter $2r$ of FIG. 1 is a multiphase DC/DC converter and includes an input line 4, an output line 6, N switching circuits SW1 to SWN, N inductors L1_1 to L1_N, output capacitors Co, a phase controller 16, an oscillator 18, a pulse modulator 20, and a distributor 22.

The DC/DC converter $2r$ steps down an input voltage $V_{IN}$ of the input line 4 to a predetermined level and supplies an output voltage $V_{OUT}$ to a load (not shown) connected to the output line 6. To the input line 4, an input capacitor Ci for stabilizing the input voltage $V_{IN}$ is connected. To the output line 6, the output capacitors Co for smoothing the output voltage $V_{OUT}$ are connected.

The plural switching circuits SW1 to SWN each include a switching transistor M1, a synchronous rectifier transistor M2, and a driver DRV. The i-th switching circuit SWi performs switching of the two transistors M1 and M2 in a complementary manner to generate a switching voltage $V_{SWi}$ at the connecting node of the two transistors (switching node).

The inductors L1_1 to L1_N are each provided for a respective one of the switching circuits SW1 to SWN. The i-th inductor L1_$i$ is provided between the switching node of the corresponding switching circuit SWi and the output line 6.

The oscillator 18 generates a periodic signal $S_{OSC}$ having a predetermined frequency. The pulse modulator 20 is e.g. a pulse width modulator and generates a pulse signal $S_{PWM}$ in synchronization with the periodic signal $S_{OSC}$ based on a feedback voltage $V_{FB}$ depending on the output voltage $V_{OUT}$. For example the feedback voltage $V_{FB}$ is a voltage obtained by dividing the output voltage $V_{OUT}$ by resistors R1 and R2. The pulse modulator 20 adjusts the duty ratio of the pulse signal $S_{PWM}$ so that the feedback voltage $V_{FB}$ may correspond with a predetermined reference voltage $V_{REF}$. By this feedback control, the output voltage $V_{OUT}$ is stabilized to a target level $V_{REF} \times (R1+R2)/R2$.

The phase controller 16 sets the number K of drive phases. For example in the case of N=4, K can be selected from four values of 1, 2, 3, and 4.

The distributor 22 selects K switching circuits among the N switching circuits SW1 to SWN and distributes pulse signals $S_{PWM1}$ to $S_{PWMK}$ to each of the selected K switching circuits with a phase difference of (360/K) degrees.

The configuration of the DC/DC converter $2r$ is as described above. Next, the operation thereof will be described. Here, a case in which N=4 and the number K of drive phases can take 2, 3, and 4 will be described. FIGS. 2A to 2C are waveform diagrams showing switching voltages $V_{SW1}$ to $V_{SW4}$ when K=2, 3, and 4, respectively.

SUMMARY

The present inventors have reached recognition of the following problem as a result of making studies on the DC/DC converter $2r$ of FIG. 1.

FIGS. 3A to 3C are waveform diagrams of the output voltage $V_{OUT}$ when K=2, 3, and 4, respectively. The output voltage $V_{OUT}$ has a periodic ripple synchronized with the switching operation of the DC/DC converter $2r$. In general, it is preferable that the ripple of the output voltage $V_{OUT}$ supplied to the load is small. However, the DC/DC converter $2r$ of FIG. 1 has a problem that, when the number K of drive phases is changed with the switching frequency fixed, the ripple amount increases with a specific number of drive phases.

The present disclosure is devised in view of such a problem and preferably provides a DC/DC converter capable of suppressing increase in the ripple amount of the output voltage in association with switching of the number of drive phases.

A certain mode of the present disclosure relates to a DC/DC converter. The DC/DC converter includes an input line to which a DC input voltage is supplied, a smoothing circuit that includes an output line and at least one output capacitor connected to the output line, and N (N is an integer equal to or larger than 2) switching circuits that each include a switching transistor and a synchronous rectifier transistor provided in series between the input line and a ground line, and each generate a switching voltage at a switching node that is a connecting node of the switching transistor and the synchronous rectifier transistor according to an input pulse signal. The DC/DC converter further includes N inductors that are each provided for a respective one of the switching circuits and are each provided between the switching node of the switching circuit that corresponds and the output line, and a phase controller that dynamically switches the number K (K is an integer equal to or smaller than N) of drive phases according to the state of the DC/DC converter at the time. The DC/DC converter further includes a pulse modulator that generates the pulse signal whose duty ratio is so adjusted that a feedback voltage depending on an output voltage of the output line corresponds with a predetermined reference voltage and whose frequency changes according to the number K of drive phases, and a distributor that selects K switching circuits among the N switching circuits and distributes the pulse signal to each of the selected K switching circuits with a phase difference of (360/K) degrees.

The present inventors have found that the ripple amount of the output voltage changes according to the product of the frequency of the pulse signal (referred to also as switching frequency) and the number K of drive phases. According to this mode, increase in the ripple amount can be suppressed by changing the frequency of the pulse signal according to change in the number K of drive phases.

Another mode of the present disclosure is also a DC/DC converter. This DC/DC converter includes an input line to which a DC input voltage is supplied, a smoothing circuit that includes an output line and at least one output capacitor connected to the output line, and N (N is an integer equal to or larger than 2) switching circuits that each include a switching transistor and a synchronous rectifier transistor provided in series between the input line and a ground line, and each generate a switching voltage at a switching node that is a connecting node of the switching transistor and the synchronous rectifier transistor according to an input pulse signal. The DC/DC converter further includes N inductors that are each provided for a respective one of the switching circuits and are each provided between the switching node of the switching circuit that corresponds and the output line, and a pulse modulator that generates the pulse signal whose duty ratio is so adjusted that a feedback voltage depending on an output voltage of the output line corresponds with a predetermined reference voltage. The DC/DC converter further includes a phase controller that decides the number K of drive phases, and a distributor that selects K switching circuits among the N switching circuits and distributes the pulse signal to each of the selected K switching circuits with a phase difference of (360/K) degrees. The frequency of the pulse signal for each of the numbers of drive phases is so set that a ripple of the output voltage becomes smaller compared with a case in which the frequency of the pulse signal is set constant irrespective of the number of drive phases.

According to this mode, the switching frequency is allowed to be varied and the switching frequency for each of the numbers of drive phases is so set that increase in the ripple of the output voltage is avoided. This can suppress increase in the ripple amount while keeping high efficiency.

A further mode of the present disclosure is a game machine including a DC/DC converter. The DC/DC converter includes: an input line to which a DC input voltage is supplied; a smoothing circuit that includes an output line and at least one output capacitor connected to the output line; N switching circuits that each include a switching transistor and a synchronous rectifier transistor provided in series between the input line and a ground line, and each generate a switching voltage at a switching node that is a connecting node of the switching transistor and the synchronous rectifier transistor according to an input pulse signal, wherein N is an integer at least 2; N inductors that are each provided for a respective one of the switching circuits and are each provided between the switching node of the switching circuit that corresponds and the output line; a phase controller that dynamically switches the number K of drive phases according to a state of the DC/DC converter at the time, wherein K is an integer up to N; a pulse modulator that generates the pulse signal whose duty ratio is so adjusted that a feedback voltage depending on an output voltage of the output line corresponds with a predetermined reference voltage and whose frequency changes according to the number K of drive phases; and a distributor that selects K switching circuits among the N switching circuits and distributes the pulse signal to each of the selected K switching circuits with a phase difference of 360/K degrees.

What are obtained by converting arbitrary combinations of the above-described constituent elements and expressions of the present disclosure among method, device, system, and so forth are also effective as a mode of the present disclosure.

According to the present disclosure, increase in the ripple amount of the output voltage in association with switching of the number of drive phases can be suppressed.

BRIEF DESCRIPTION OF THE DRAWINGS

FIGS. 8A to 8C are waveform diagrams of an output voltage $V_{OUT}$ when K=2, 3, and 4, respectively, in the DC/DC converter of FIG. 4;

DETAILED DESCRIPTION OF THE PREFERRED EMBODIMENT

The present disclosure will be described below based on a preferred embodiment with reference to the drawings. The same or equivalent constituent element, member, or processing shown in the respective diagrams will be given the same numeral and overlapping description will be accordingly omitted. Furthermore, the embodiment does not limit the disclosure and is an exemplification, and all characteristics and combinations thereof described in the embodiment are not necessarily essentials for the disclosure.

In the present specification, "state in which a member A is connected to a member B" encompasses not only the case in which the member A and the member B are physically connected directly but also the case in which the member A and the member B are indirectly connected via another member that has no influence on the electrically connected state.

Similarly, "state in which a member C is provided between a member A and a member B" encompasses not only the case in which the member A and the member C or the member B and the member C are directly connected but also the case in which they are indirectly connected via another member that has no influence on the electrically connected state.

Figure 4:
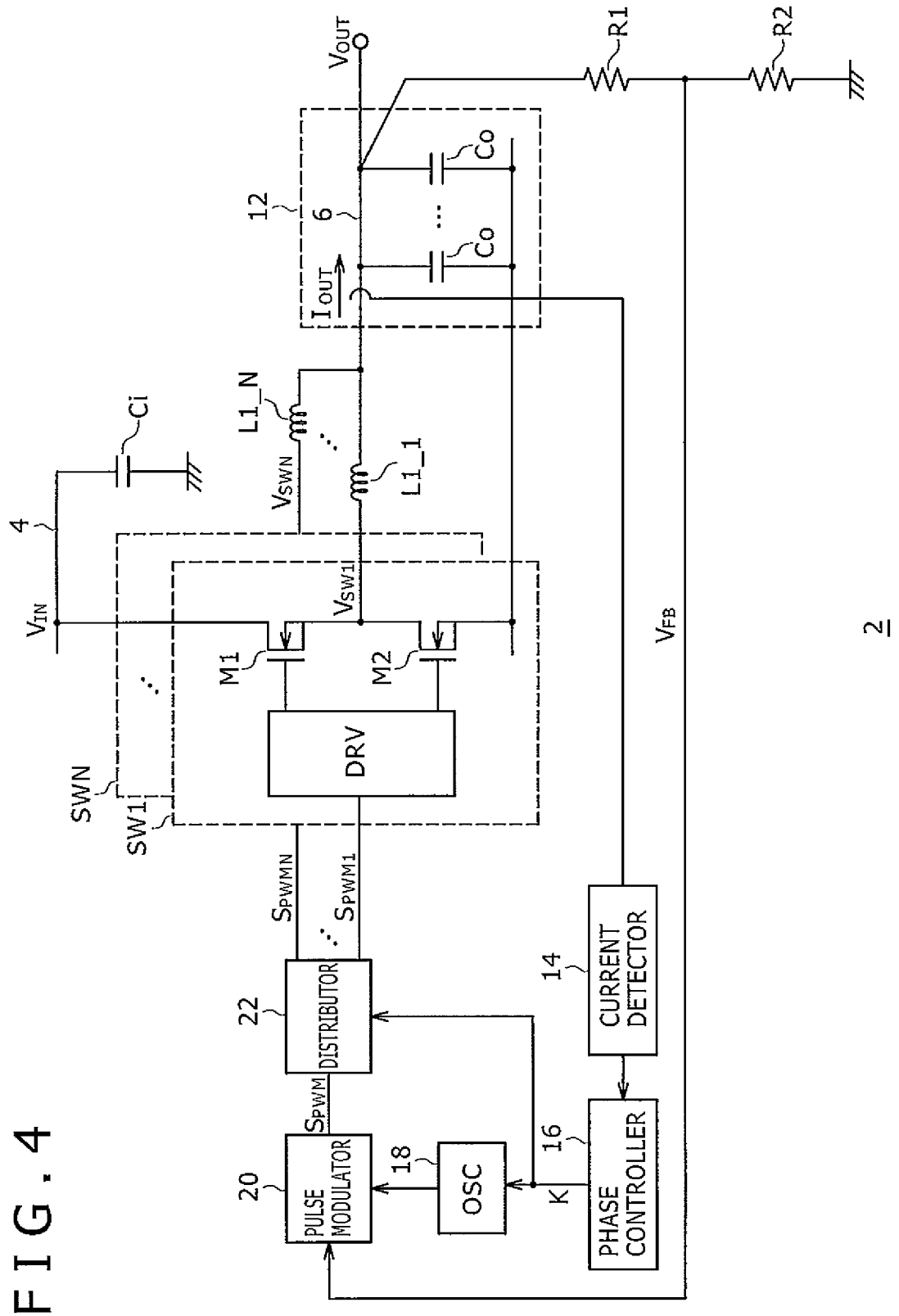
FIG. 4 is a circuit diagram showing the configuration of a DC/DC converter according to an embodiment.

FIG. 4 is a circuit diagram showing the configuration of a DC/DC converter 2 according to the embodiment. The DC/DC converter 2 steps down a voltage $V_{IN}$ of an input line 4 and stabilizes the voltage to a predetermined level to supply an output voltage $V_{OUT}$ to a load (not shown) connected to an output line 6.

The DC/DC converter 2 includes the input line 4, the output line 6, N switching circuits SW1 to SWN, N inductors L1_1 to L1_N, an output capacitor Co, a current detector 14, a phase controller 16, an oscillator 18, a pulse modulator 20, a distributor 22, and resistors R1 and R2.

N may be an arbitrary integer equal to or larger than 2. In the present embodiment, the case of N=4 will be described for simplification of explanation and facilitation of understanding.

To the output line 6, one or preferably plural output capacitors Co are connected. The output capacitor Co includes an aluminum electrolytic capacitor, a multilayer ceramic capacitor, etc. In the present embodiment, the output line 6, the output capacitor Co, and a ground line 8 connected to the output capacitor Co are referred to as a smoothing circuit 12 in a comprehensive manner.

The plural switching circuits SW1 to SWN each include a switching transistor M1, a synchronous rectifier transistor M2, and a driver DRV. In the i-th switching circuit SWi, the driver DRV performs switching of the two transistors M1 and M2 in a complementary manner based on a pulse signal $S_{PWMi}$ input to the driver DRV to generate a switching voltage $V_{SWi}$ at the connecting node of the two transistors (switching node). In FIG. 4, the switching transistor M1 is an N-channel metal oxide semiconductor field effect transistor (MOSFET). To turn on the switching transistor M1, a drive voltage higher than the input voltage $V_{IN}$ needs to be applied to the gate of the switching transistor M1. In order to generate such a drive voltage, the driver DRV includes a bootstrap circuit. The switching transistor M1 may be a P-channel MOSFET. In this case, the bootstrap circuit is unnecessary.

The inductors L1_1 to L1_N are each provided for a respective one of the switching circuits SW1 to SWN. The i-th inductor L1_i is provided between the switching node of the corresponding switching circuit SWi and the output line 6.

The phase controller 16 dynamically switches the number K of drive phases (K is an integer equal to or smaller than N) according to the state of the DC/DC converter 2 at the time. In the present embodiment, the number K of drive phases can be switched among three values of 2, 3, and 4.

The current detector 14 detects a load current $I_{OUT}$, which is the output current of the DC/DC converter 2. The configuration of the current detector 14 is not particularly limited and a publicly-known technique may be used. For example, the current detector 14 may include a detection resistor provided on the path of the output line 6 and an amplifier that amplifies a voltage drop across the detection resistor.

In the present embodiment, the phase controller 16 selects the number K of drive phases according to the load current $I_{OUT}$. When the number K of drive phases is changed, the efficiency of the whole of the DC/DC converter 2 changes. This is because of the following reason. Specifically, the efficiency is affected mainly by switching loss in the switching circuits SW1 to SWN and core loss in the inductors L1_1 to L1_N. When the number of drive phases is changed, the switching loss changes and also the amount of current flowing in the respective inductors changes so that the core loss per inductor changes.

In other words, the number K of drive phases yielding the highest efficiency differs by each range of the load current $I_{OUT}$. So, the phase controller 16 compares the detected load current $I_{OUT}$ with a predetermined threshold to select the number K of drive phases with which the highest efficiency is obtained according to the range of the load current $I_{OUT}$.

The oscillator 18 generates a periodic signal $S_{OSC}$ having a frequency corresponding to the number of K of drive phases set by the phase controller 16. The configuration of the oscillator 18 is not particularly limited and it can be configured by an oscillator utilizing a charge/discharge of capacitance, an oscillator using a counter that counts a clock signal, or the like.

The resistors R1 and R2 divide the output voltage $V_{OUT}$ of the output line 6 to generate a feedback voltage $V_{FB}$ depending on the output voltage $V_{OUT}$. In synchronization with the periodic signal $S_{OSC}$, the pulse modulator 20 generates the pulse signal $S_{PWM}$ whose duty ratio is so adjusted that the feedback voltage $V_{FB}$ corresponds with a predetermined reference voltage $V_{REF}$. That is, the frequency of the pulse signal $S_{PWM}$ changes depending on the number K of drive phases.

Preferably the pulse modulator 20 may be a pulse width modulator or may be a pulse frequency modulator. Furthermore, as the control system by the pulse modulator 20, a voltage mode, an average current mode, a peak current mode, or another system can be utilized. That is, the modulation system and configuration of the pulse modulator 20 are not particularly limited.

The distributor 22 receives a signal that indicates the number K of drive phases. The distributor 22 selects K switching circuits among the N switching circuits SW1 to SWN and distributes the pulse signal $S_{PWM}$ to each of the selected K switching circuits SW1 to SWK with a phase difference of (360/K) degrees.

The whole configuration of the DC/DC converter 2 is as described above. In the DC/DC converter 2, the oscillation frequency of the oscillator 18, i.e. the frequency of the pulse signal $S_{PWM}$, is set as follows.

The frequency f of the pulse signal $S_{PWM}$ is set based on the resonant frequency of the impedance of the smoothing circuit 12 for at least one value among the plural values (2, 3, 4) the number K of drive phases can take. In the following, this point will be described in detail.

Figure 5:
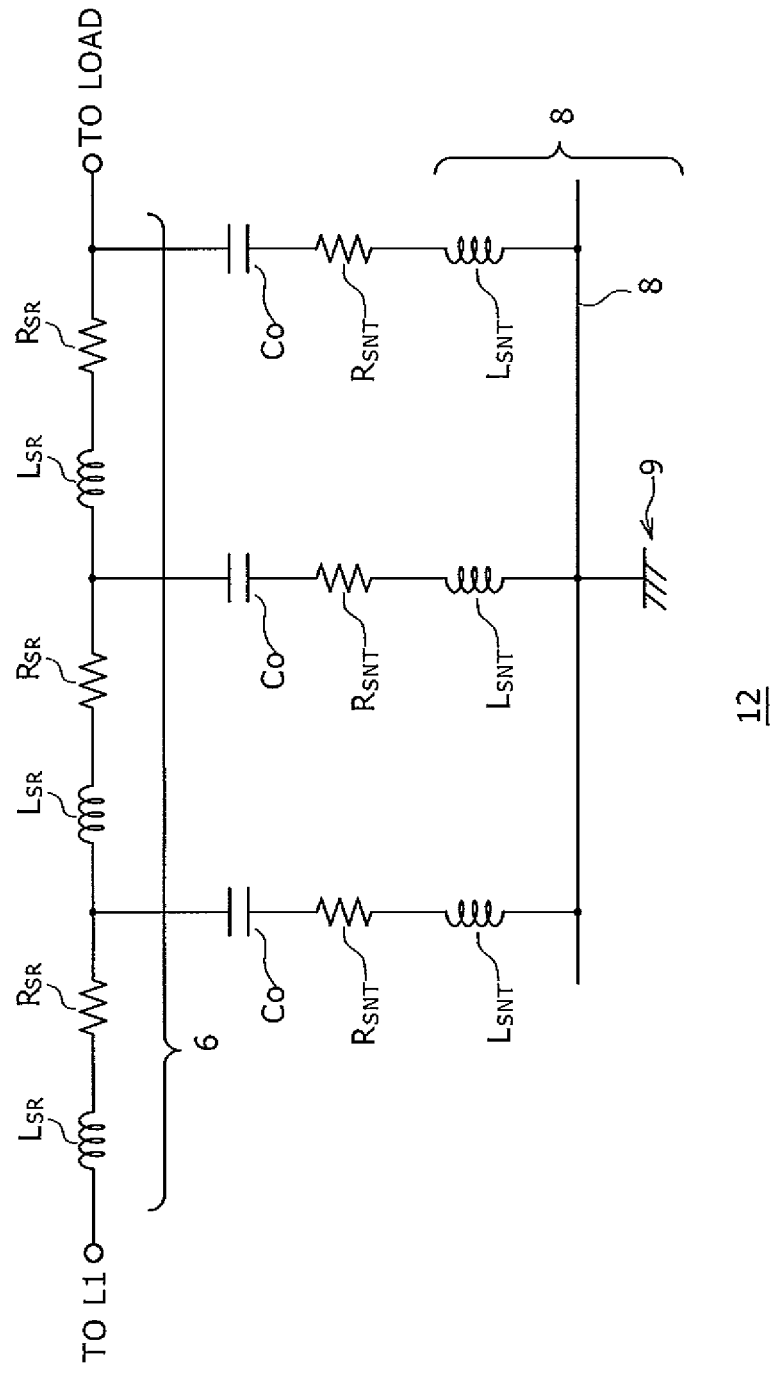
FIG. 5 is an equivalent circuit diagram of a smoothing circuit.

FIG. 5 is an equivalent circuit diagram of the smoothing circuit 12. The output line 6 includes parasitic resistance and parasitic inductance and they are shown as series resistance $R_{SR}$ and series inductance $L_{SR}$.

Furthermore, between the output line 6 and an ideal ground 9, shunt resistance $R_{SNT}$ and shunt inductance $L_{SNT}$ exist in addition to the effective capacitance component of the output capacitor Co. The shunt resistance $R_{SNT}$ includes the equivalent series resistance (ESR) of the output capacitor Co and the resistance component of the ground line 8 and via-hole. The shunt inductance $L_{SNT}$ includes the inductance component of the ground line 8 and via-hole.

The present inventors have found that the ripple amount of the output voltage $V_{OUT}$ changes depending on the product of the frequency f of the pulse signal $S_{PWM}$ and the number K of drive phases (hereinafter, referred to also as fK product in the present specification). As shown in the equivalent circuit of FIG. 5, the smoothing circuit 12 is grasped as a resonant circuit including resistance, inductance, and capacitance and its impedance has frequency dependence; the impedance is high at a certain frequency and is low at the resonant frequency.

The ripple amount $\Delta V$ of the output voltage $V_{OUT}$ can be approximated to be proportional to the product of the fluctuation amount (ripple) $\Delta I$ of the total of the currents supplied from the K inductors L1_1 to L1_K to the smoothing circuit 12 and the impedance Z of the smoothing circuit 12.

The total current supplied from the K inductors L1_1 to L1_K to the smoothing circuit 12 is the sum of coil currents $I_{COIL}$ flowing to each of the inductors L1_1 to L1_K and the substantive frequency of the total current can be regarded as the fK product.

From this consideration, the present inventors have reached the finding of that the ripple amount of the output voltage $V_{OUT}$ can be reduced if the fK product is set to the resonant frequency, at which the impedance of the smoothing circuit 12 is low. As described later, the frequency characteristic of the impedance of the smoothing circuit 12 have a dip at a resonant frequency and the dip has a certain level of bandwidth. Therefore, the fK product does not need to be strictly set to the resonant frequency and it is enough that the fK product is so close to the resonant frequency as to be included in the bandwidth of the dip. Therefore, in the present specification and the scope of claims, the "resonant frequency" includes a resonant frequency and the vicinity of the resonant frequency included in the band of one dip.

Figure 6:
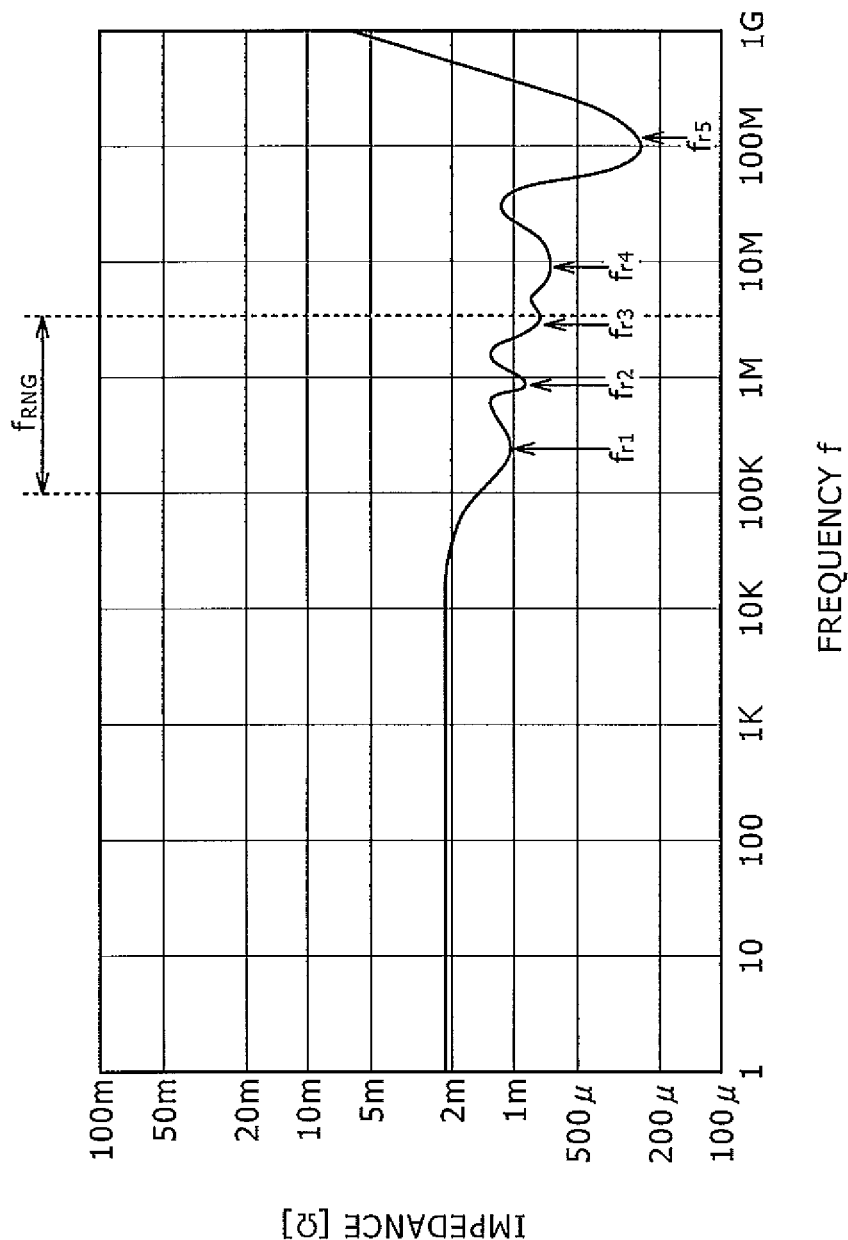
FIG. 6 is a diagram showing frequency dependence of the impedance of the smoothing circuit.

FIG. 6 is a diagram showing the frequency dependence of the impedance of the smoothing circuit 12. The impedance of the smoothing circuit 12 can be acquired in advance at the design phase of the DC/DC converter 2 by a combination of modeling and simulation or actual measurement. In the case of actual measurement of the smoothing circuit 12, the following way (i) or (ii) may be employed: (i) one end of the smoothing circuit 12 is grounded and the impedance from the viewpoint of the other end is measured; (ii) S-parameters between one end and the other end of the smoothing circuit 12 are measured by using a network analyzer. Alternatively, the impedance when the smoothing circuit 12 is seen from the switching node via the inductor may be acquired.

In the example of FIG. 6, the smoothing circuit 12 has plural resonant frequencies fr1, fr2, fr3, fr4, and fr5.

In general, a frequency range $f_{RNG}$ that can be used in a DC/DC converter (referred to as operation frequency range) is limited depending on platform and application for which the DC/DC converter 2 is used, and the designer arbitrarily selects the switching frequency in the operation frequency range $f_{RNG}$. The operation frequency range $f_{RNG}$ is defined in consideration of electromagnetic interference (EMI), the inductance of the inductor L1, and so forth.

Referring to FIG. 6, of the plural resonant frequencies fr1 to fr5, fr1 to fr3 are included in the operation frequency range $f_{RNG}$ as the switching frequency of the DC/DC converter 2. For at least one or preferably all of the numbers K of drive phases, the switching frequency f is so set that the fK product corresponds with any one of the three resonant frequencies fr1 to fr3.

Which of the three resonant frequencies fr1 to fr3 is selected is decided in consideration of (i) the ripple amount of the output voltage, (ii) the efficiency of the DC/DC converter, (iii) load regulation, and so forth.

(i) In the case of giving priority to reducing the ripple, the resonant frequency at which the impedance is the lowest (fr3, in FIG. 6) is selected.

(ii) The efficiency of the DC/DC converter is higher when the switching frequency is lower. Therefore, in the case of giving priority to the efficiency, the low resonant frequency (fr1, in FIG. 6) is selected.

(iii) The stability of the output voltage against load variation (load regulation) is higher when the switching frequency is higher. Therefore, in the case of giving priority to the load regulation, the high resonant frequency (fr3, in FIG. 6) is selected.

In the following, setting examples of the number of drive phases and the switching frequency will be explained more specifically.

First Setting Example

In this example, reducing the ripple amount is given the first priority. Therefore, the resonant frequency fr3, which gives the lowest impedance, is selected and the fK product is set to the same value. When the switching frequency for the number K of drive phases is represented as f[K], the switching frequencies f[2], f[3], and f[4] for K=2, 3, and 4, respectively, are so set as to satisfy the following relationships.

$$f[2]=fr3/2$$

$$f[3]=fr3/3$$

$$f[4]=fr3/4$$

If this is generalized, the setting is made as follows. Specifically, when the smoothing circuit 12 has a certain resonant frequency fr, for at least two numbers k1 and k2 of drive phases, frequencies fx1 and fx2 of the pulse signal are so set as to be equal to fr/k1 and fr/k2, respectively.

If fr3=1.8 MHz, f[2]=900 kHz when the number of drive phases is 2, f[3]=600 kHz when the number of drive phases is 3, and f[4]=450 kHz when the number of drive phases is 4.

Because the resonant frequency fr3 is the highest among the three resonant frequencies, excellent load regulation is expected although the efficiency is slightly sacrificed.

In the impedance characteristic of FIG. 6, the highest resonant frequency fr3 gives the lowest impedance. However, the impedance characteristic varies depending on the configuration of the smoothing circuit 12. For example, if the lowest resonant frequency fr1 gives the lowest impedance, the resonant frequency fr1 may be selected. In this case, high efficiency can be realized although the load regulation is sacrificed. If the middle resonant frequency fr2 gives the lowest impedance, the resonant frequency fr2 may be selected. In this case, favorable balance between the load regulation and the efficiency can be achieved.

Second Setting Example

If realization of favorable balance among the reduction in the ripple amount, the efficiency, and the load regulation is desired, the middle resonant frequency fr2 may be selected.

Third Setting Example

If the design is made with the first priority given to the efficiency, the lowest resonant frequency fr1 may be selected.

Setting examples of the switching frequency are as described above. Subsequently, the operation and effects of the DC/DC converter 2 will be described.

Figure 7A:
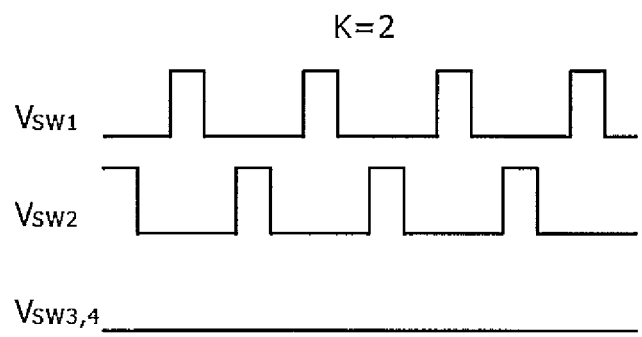
FIGS. 7A to 7C are waveform diagrams showing switching voltages $V_{SW1}$ to $V_{SW4}$ when K=2, 3, and 4, respectively, in the DC/DC converter of FIG. 4.
Figure 7B:
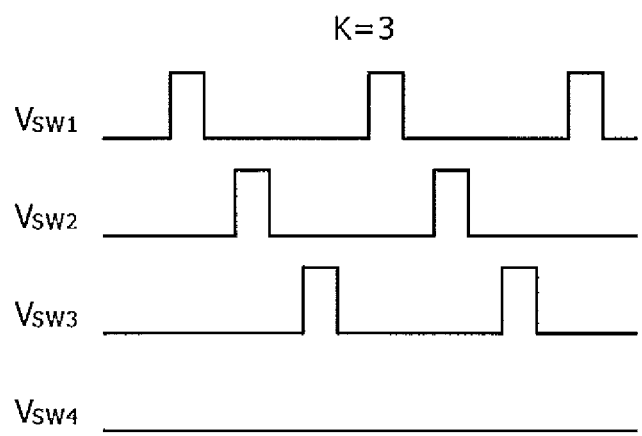
Figure 7C:
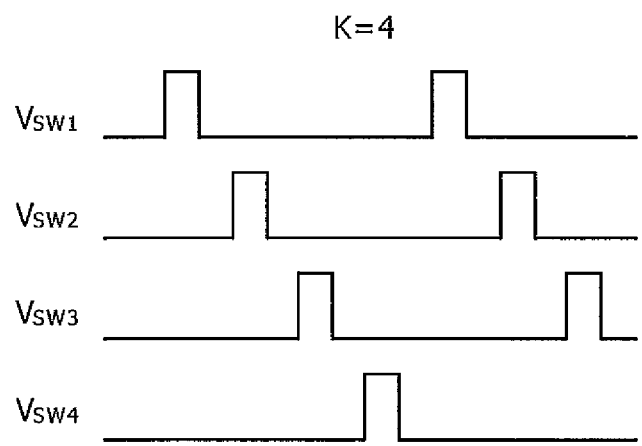

FIGS. 7A to 7C are waveform diagrams showing switching voltages $V_{SW1}$ to $V_{SW4}$ when K=2, 3, and 4, respectively, in the DC/DC converter 2 of FIG. 4. FIGS. 8A to 8C are waveform diagrams of the output voltage $V_{OUT}$ when K=2, 3, and 4, respectively, in the DC/DC converter 2 of FIG. 4.

This is the operation of the DC/DC converter 2.

Figure 1:
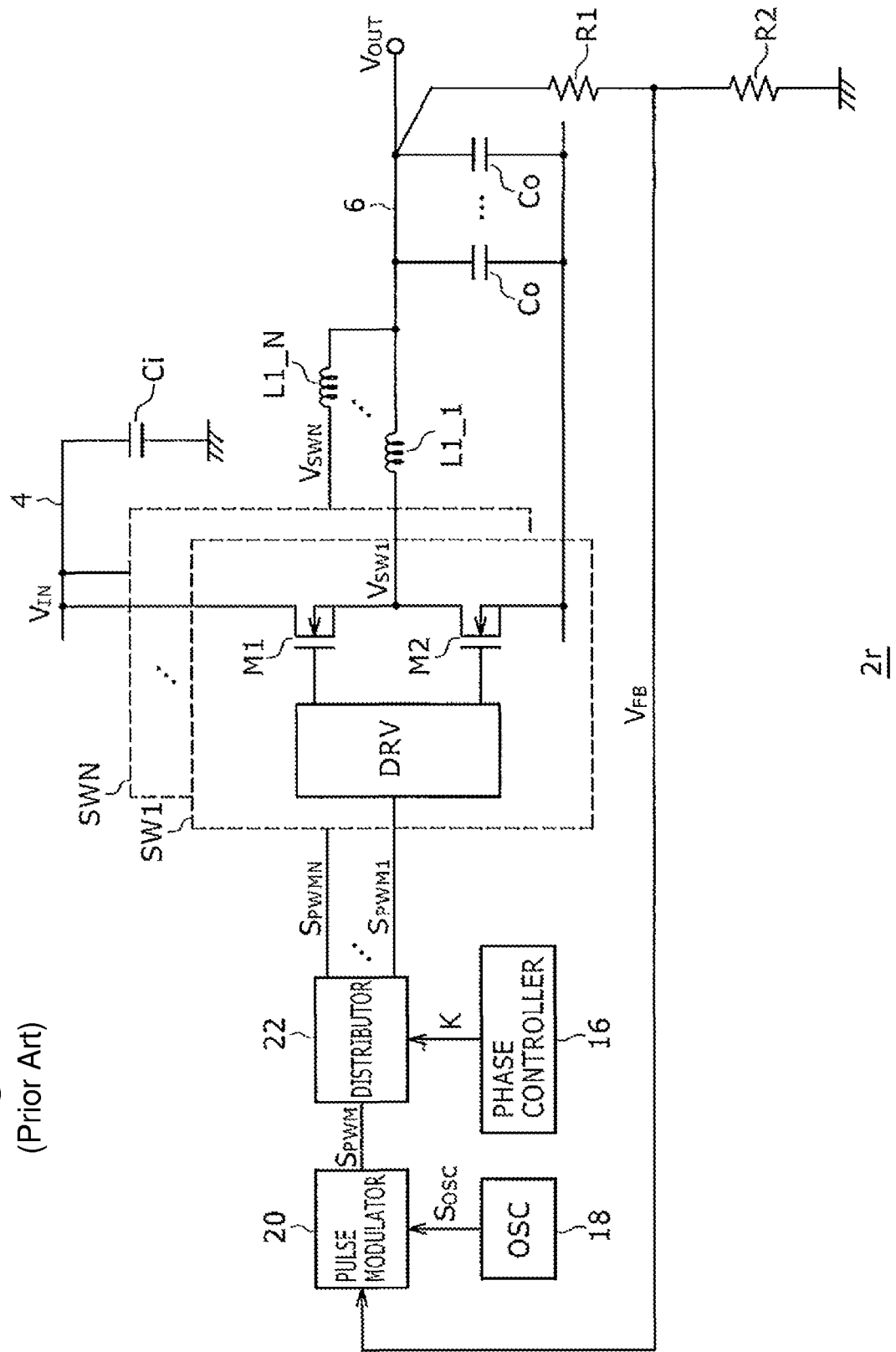
FIG. 1 is a circuit diagram showing a configuration example of a buck DC/DC converter on which the present inventors have made studies.
Figure 2A:
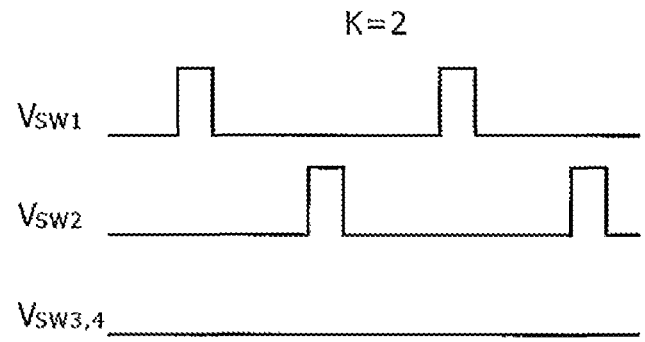
FIGS. 2A to 2C are waveform diagrams showing switching voltages $V_{SW1}$ to $V_{SW4}$ when K=2, 3, and 4, respectively.
Figure 2B:
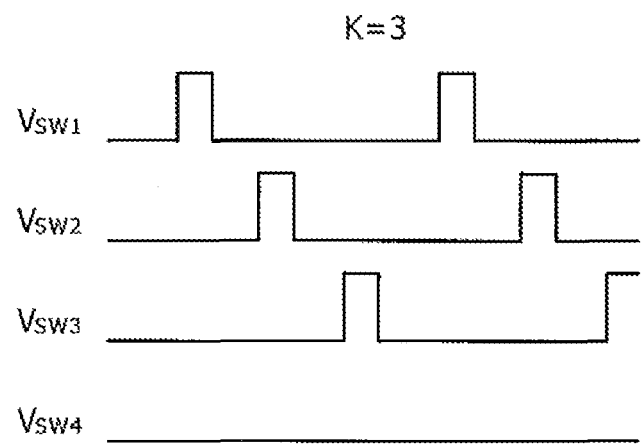
Figure 2C:
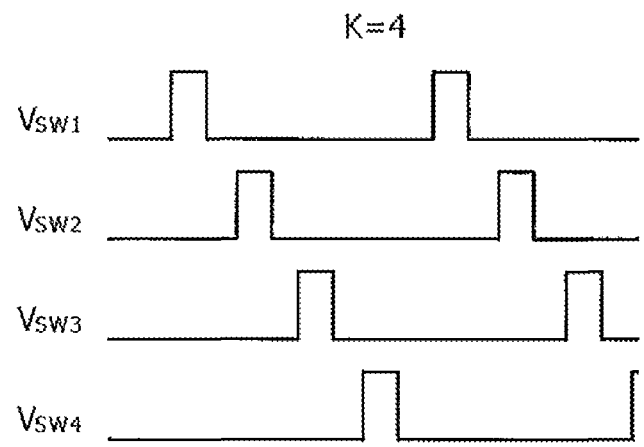
Figure 3A:
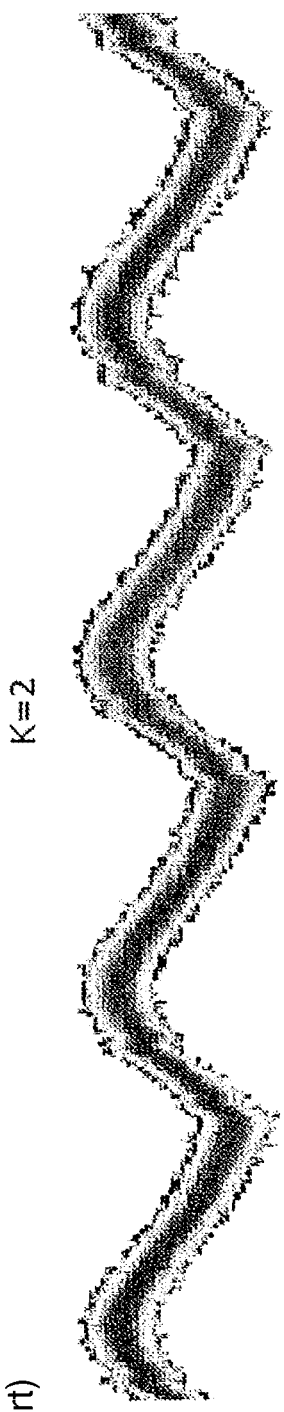
FIGS. 3A to 3C are waveform diagrams of an output voltage $V_{OUT}$ when K=2, 3, and 4, respectively.
Figure 3B:
Figure 3C:

As is apparent from comparison between FIGS. 8A to 8C and FIGS. 3A to 3C, the DC/DC converter 2 of FIG. 4 can reduce the ripple amount of the output voltage $V_{OUT}$ compared with the DC/DC converter 2r of FIG. 1. This is due to that the switching frequency f[K] for each of the numbers K of drive phases is so set that the ripple becomes smaller, specifically that the fK product becomes equal to the resonant frequency of the smoothing circuit 12 or a frequency close to it.

In addition, in the DC/DC converter 2r of FIG. 1, the frequency of the ripple of the output voltage $V_{OUT}$ differs by each of the numbers of drive phases. In contrast, in the DC/DC converter 2 of FIG. 4, the frequency of the output voltage $V_{OUT}$ can be made the same.

Subsequently, the selection of the number K of drive phases by the phase controller 16 will be described. As described above, the phase controller 16 switches the number K of drive phases according to the load current $I_{OUT}$ so that the efficiency of the DC/DC converter 2 may become higher.

Figure 9:
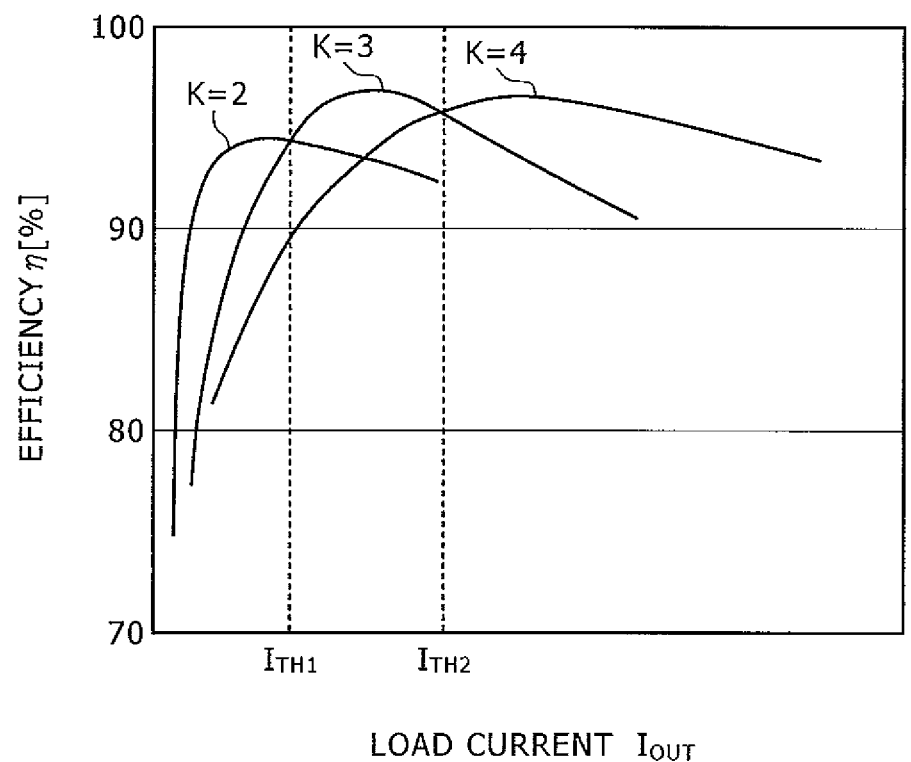
FIG. 9 is a diagram showing the relationships between a load current $I_{OUT}$ and the efficiency when K=2, 3, and 4.

FIG. 9 is a diagram showing the relationships between the load current $I_{OUT}$ and the efficiency when K=2, 3, and 4. These values of efficiency are calculated on the assumption of the first setting example, i.e. the case in which the switching frequency f[K] for each of the numbers K of drive phases is so set as to satisfy f[2]=fr/2, f[3]=fr/3, and f[4]=fr/4 when the resonant frequency with which the ripple becomes smaller is defined as fr.

Referring to FIG. 9, the current range giving high efficiency differs by each of the numbers K of drive phases=2, 3, and 4. Specifically, K=2 gives the maximum efficiency in the range of $I_{OUT}<I_{TH1}$, K=3 gives the maximum efficiency in the range of $I_{TH1}<I_{OUT}<I_{TH2}$, and K=4 gives the maximum efficiency in the range of $I_{TH2}<I_{OUT}$. If the threshold currents $I_{TH1}$ and $I_{TH2}$ are set in advance based on simulation or actual measurement, the phase controller 16 can realize high efficiency in the whole current range by comparing the current detection value of the current detector 14 with the thresholds $I_{TH1}$ and $I_{TH2}$.

Figure 10:
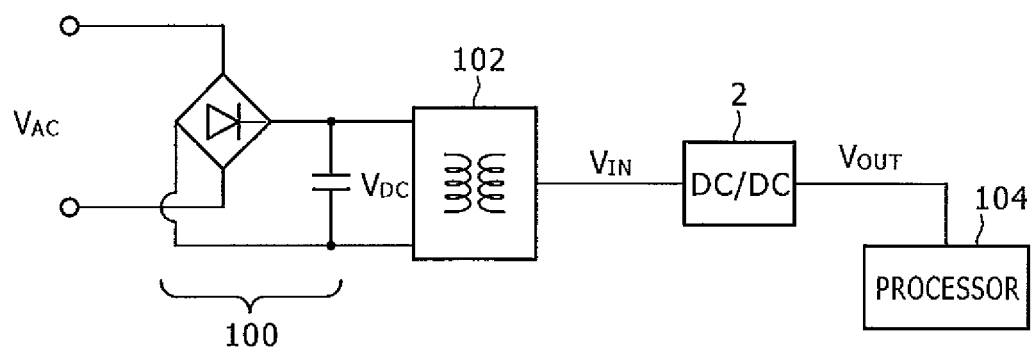
FIG. 10 is a block diagram showing the configuration of electronic apparatus equipped with the DC/DC converter of FIG. 4.

Finally, one example of the use purposes of the DC/DC converter 2 will be described. FIG. 10 is a block diagram showing the configuration of electronic apparatus 1 equipped with the DC/DC converter 2.

The electronic apparatus 1 is e.g. a game dedicated machine or a computer. A rectifier circuit 100 rectifies and smoothes a commercial AC voltage $V_{AC}$ to generate a DC voltage $V_{DC}$. An insulated DC/DC converter 102 steps down the DC voltage $V_{DC}$ to generate the input voltage $V_{IN}$. The DC/DC converter 2 steps down the input voltage $V_{IN}$ and supplies the output voltage $V_{OUT}$ to a load, specifically e.g. a power supply terminal of a processor 104.

The present disclosure is explained above based on the embodiment. This embodiment is an exemplification and those skilled in the art will understand that various modification examples are possible in the combination of the respective constituent elements and respective processing processes of the embodiment and these modification examples are also included in the scope of the present disclosure. Such modification examples will be described below.

First Modification Example

In the embodiment, the switching frequencies f[2], f[3], and f[4] are so decided that the product of the number K of drive phases and the switching frequency f takes the same value set according to the resonant frequency of the smoothing circuit 12 for all of the numbers K of drive phases=2, 3, and 4. However, the present disclosure is not limited thereto.

As shown in FIG. 6, the smoothing circuit 12 has plural resonant frequencies in the operation frequency range $f_{RNG}$ in some cases. In this case, the fK product may differ by each of the numbers of drive phases. If this is generalized, the setting is made as follows. Specifically, when the smoothing circuit 12 has resonant frequencies fr1 and fr2, for at least two numbers k1 and k2 of drive phases, switching frequencies fx1 and fx2 are so set as to be equal to fr1/k1 and fr2/k2, respectively.

For example, the switching frequencies f[2], f[3], and f[4] for K=2, 3, and 4, respectively, may be so set as to satisfy the following relationships.

$$f[2]=fr\cdot 1/2$$

$$f[3]=fr\cdot 2/3$$

$$f[4]=fr\cdot 3/4$$

If the same resonant frequency is used for different numbers of drive phases like in the embodiment, the efficiency when the number of drive phases is small and the load regulation when the number of drive phases is large are in a trade-off relationship. In contrast, according to the first modification example, the switching frequency f[2] is set low when the number K of drive phases=2 and the switching frequency f[4] is set high when K=4. Thus, the DC/DC converter 2 can be designed without restraint by the trade-off relationship.

Alternatively, the switching frequencies f[2], f[3], and f[4] for K=2, 3, and 4, respectively, may be so set as to satisfy the following relationships.

$$f[2]=fr\cdot 3/2$$

$$f[3]=fr\cdot 2/3$$

$$f[4]=fr\cdot 1/4$$

Which resonant frequency is assigned to which number of drive phases can be decided in consideration of the efficiency, the ripple amount, and the load regulation. This allows selection of such a switching frequency that the highest efficiency is achieved with suppression of the ripple amount to a low amount.

Second Modification Example

The setting method of the switching frequency described in the embodiment and the setting method of the switching frequency in the first modification example may be combined.

For example, the switching frequencies may be set as follows.

$$f[2]=fr\cdot 3/2$$

$$f[3]=fr\cdot 2/3$$

$$f[4]=fr\cdot 2/4$$

Moreover, the fK product may be set independently of the resonant frequency for a certain number of drive phases.

Third Modification Example

In the embodiment, the case is described in which the resonant frequency fr of the smoothing circuit 12 is acquired by performing modeling of the whole of the smoothing circuit 12 and simulation or by performing actual measurement of the real smoothing circuit 12. However, the present disclosure is not limited thereto.

For example, in the situation in which the parasitic inductance of the printed board on which the output capacitor Co is mounted can be ignored, the resonant frequency of the smoothing circuit 12 is close to the resonant frequency of the output capacitor Co. Therefore, in this situation, the fK product may be set equal to the resonant frequency of the output capacitor Co or a frequency close to it.

Fourth Modification Example

Although the case in which the numbers of drive phases that can be set are 2 to N is described in the embodiment, the numbers of phases that can be set are arbitrary. For example, the numbers K of drive phases may be so selected that $K=1, 2, \ldots, 2^m$.

Fifth Modification Example

In the embodiment, the load current $I_{OUT}$ is detected in the DC/DC converter 2 and the number K of drive phases is set based on the result thereof. However, the present disclosure is not limited thereto. For example, if the load of the DC/DC converter 2 knows its own load current $I_{OUT}$, data indicating the load current may be transmitted from the load to the DC/DC converter 2 and the phase controller 16 may select the number K of drive phases based on this data.

The present disclosure is described above based on the embodiment. The embodiment is an exemplification and those skilled in the art will understand that various modification examples are possible in the combination of the respective constituent elements and respective processing processes of the embodiment and these modification examples are also included in the scope of the present disclosure.

The present technology contains subject matter related to that disclosed in Japanese Priority Patent Application JP2012-235020 filed in the Japan Patent Office on Oct. 24, 2012, the entire content of which is hereby incorporated by reference.

What is claimed is:

1. A DC/DC converter comprising:
   an input line to which a DC input voltage is supplied;
   a smoothing circuit that includes an output line and at least one output capacitor connected to the output line;
   N switching circuits that each include a switching transistor and a synchronous rectifier transistor provided in series between the input line and a ground line, and each generate a switching voltage at a switching node that is a connecting node of the switching transistor and the synchronous rectifier transistor according to an input pulse signal, wherein N is an integer at least 2;

N inductors that are each provided for a respective one of the switching circuits and are each provided between the switching node of the switching circuit that corresponds and the output line;

a phase controller that dynamically switches the number K of drive phases according to a state of the DC/DC converter at the time, wherein K is an integer up to N;

a pulse modulator that generates the pulse signal having a duty ratio that is adjusted such that a feedback voltage depending on an output voltage of the output line corresponds with a predetermined reference voltage, and having a frequency that changes according to the number K of drive phases; and a distributor that selects K switching circuits among the N switching circuits and distributes the pulse signal to each of the selected K switching circuits with a phase difference of 360/K degrees.

2. The DC/DC converter according to claim 1, wherein if the smoothing circuit has a certain resonant frequency fr, for at least one number K1 of drive phases, frequency f1 of the pulse signal is so set as to be equal to fr/K1.

3. The DC/DC converter according to claim 2, wherein if the smoothing circuit has the certain resonant frequency fr, for at least two numbers K1 and K2 of drive phases, frequencies fx1 and fx2 of the pulse signal are so set as to be equal to fr/K1 and fr/K2, respectively.

4. The DC/DC converter according to claim 2, wherein if the smoothing circuit has resonant frequencies fr1 and fr2, for at least two numbers K1 and K2 of drive phases, frequencies fx1 and fx2 of the pulse signal are so set as to be equal to fr1/K1 and fr2/K2, respectively.

5. The DC/DC converter according to claim 1, wherein the frequency of the pulse signal is set based on a resonant frequency of impedance of the smoothing circuit for all of the numbers of drive phases.

6. The DC/DC converter according to claim 1, wherein the state of the DC/DC converter is a load current.

7. The DC/DC converter according to claim 1, wherein the phase controller selects the number of drive phases giving highest efficiency in the state of the DC/DC converter at the time.

8. A DC/DC converter comprising:
an input line to which a DC input voltage is supplied;
a smoothing circuit that includes an output line and at least one output capacitor connected to the output line;
N switching circuits that each include a switching transistor and a synchronous rectifier transistor provided in series between the input line and a ground line, and each generate a switching voltage at a switching node that is a connecting node of the switching transistor and the synchronous rectifier transistor according to an input pulse signal, wherein N is an integer at least 2;
N inductors that are each provided for a respective one of the switching circuits and are each provided between the switching node of the switching circuit that corresponds and the output line;
a pulse modulator that generates the pulse signal having a duty ratio that is adjusted such that a feedback voltage depending on an output voltage of the output line corresponds with a predetermined reference voltage;
a phase controller that decides the number K of drive phases; and
a distributor that selects K switching circuits among the N switching circuits and distributes the pulse signal to each of the selected K switching circuits with a phase difference of 360/K degrees,
wherein a frequency of the pulse signal for each of the numbers of drive phases is set such that a ripple of the output voltage becomes smaller compared with a case in which the frequency of the pulse signal is set constant irrespective of the number of drive phases.

9. The DC/DC converter according to claim 8, wherein: the pulse modulator controls frequency of the pulse signal in such a manner that a product of the number K of drive phases and the frequency of the pulse signal becomes a predetermined value set according to a resonant frequency of the smoothing circuit.

10. A game machine comprising
a DC/DC converter including:
an input line to which a DC input voltage is supplied;
a smoothing circuit that includes an output line and at least one output capacitor connected to the output line;
N switching circuits that each include a switching transistor and a synchronous rectifier transistor provided in series between the input line and a ground line, and each generate a switching voltage at a switching node that is a connecting node of the switching transistor and the synchronous rectifier transistor according to an input pulse signal, wherein N is an integer at least 2;
N inductors that are each provided for a respective one of the switching circuits and are each provided between the switching node of the switching circuit that corresponds and the output line;
a phase controller that dynamically switches the number K of drive phases according to a state of the DC/DC converter at the time, wherein K is an integer up to N;
a pulse modulator that generates the pulse signal having a duty ratio that is adjusted such that a feedback voltage depending on an output voltage of the output line corresponds with a predetermined reference voltage and, having a frequency that changes according to the number K of drive phases; and
a distributor that selects K switching circuits among the N switching circuits and distributes the pulse signal to each of the selected K switching circuits with a phase difference of 360/K degrees.

* * * * *